United States Patent [19]

Hay, II et al.

[11] 4,175,998

[45] Nov. 27, 1979

[54] FOAM WELDING APPARATUS

[75] Inventors: Robert A. Hay, II, Midland; John S. Boruszewski, Saginaw, both of Mich.

[73] Assignee: The Dow Chemical Company, Midland, Mich.

[21] Appl. No.: 925,586

[22] Filed: Jul. 17, 1978

[51] Int. Cl.² ............... H05B 3/20; B29C 27/22; B32B 31/04; B65H 81/04
[52] U.S. Cl. .................. 156/391; 52/80; 156/71; 156/186; 156/195; 156/304; 156/306; 156/425; 156/445; 156/475; 156/499; 156/544; 156/575; 219/201; 219/221; 219/552; 220/414; 264/32; 425/60; 425/375
[58] Field of Search .......... 52/80, 573; 156/71, 156/184, 185, 186, 195, 304, 322, 391, 425, 445, 475, 499, 544, 574, 306; 219/221, 228, 201, 243, 464, 532, 552; 264/32, 46.2, 46.4, 248; 425/60, 63, 375; 220/414

[56] References Cited

U.S. PATENT DOCUMENTS

| | | | |
|---|---|---|---|
| 2,686,861 | 8/1954 | Waller | 219/228 |
| 3,206,899 | 9/1965 | Wright | 52/80 |
| 3,282,766 | 11/1966 | Wright | 156/499 |
| 3,337,384 | 8/1967 | Wright | 156/425 |
| 3,507,735 | 4/1970 | Chisholm | 156/380 |
| 3,923,573 | 12/1975 | Hay | 156/192 |
| 3,924,039 | 12/1975 | Smith | 428/119 |
| 3,954,539 | 5/1976 | Smith | 156/185 |
| 4,017,346 | 4/1977 | Smith | 156/185 |
| 4,050,607 | 9/1977 | Smith | 156/186 X |

Primary Examiner—John T. Goolkasian
Assistant Examiner—Robert A. Dawson
Attorney, Agent, or Firm—R. B. Ingraham

[57] ABSTRACT

Improved welds for thermoplastic foam insulation spirally deposited about a structure are obtained employing a thin, resistance heated welding blade which beneficially is positioned by means of a four-bar linkage connecting the blade to the blade support.

6 Claims, 5 Drawing Figures

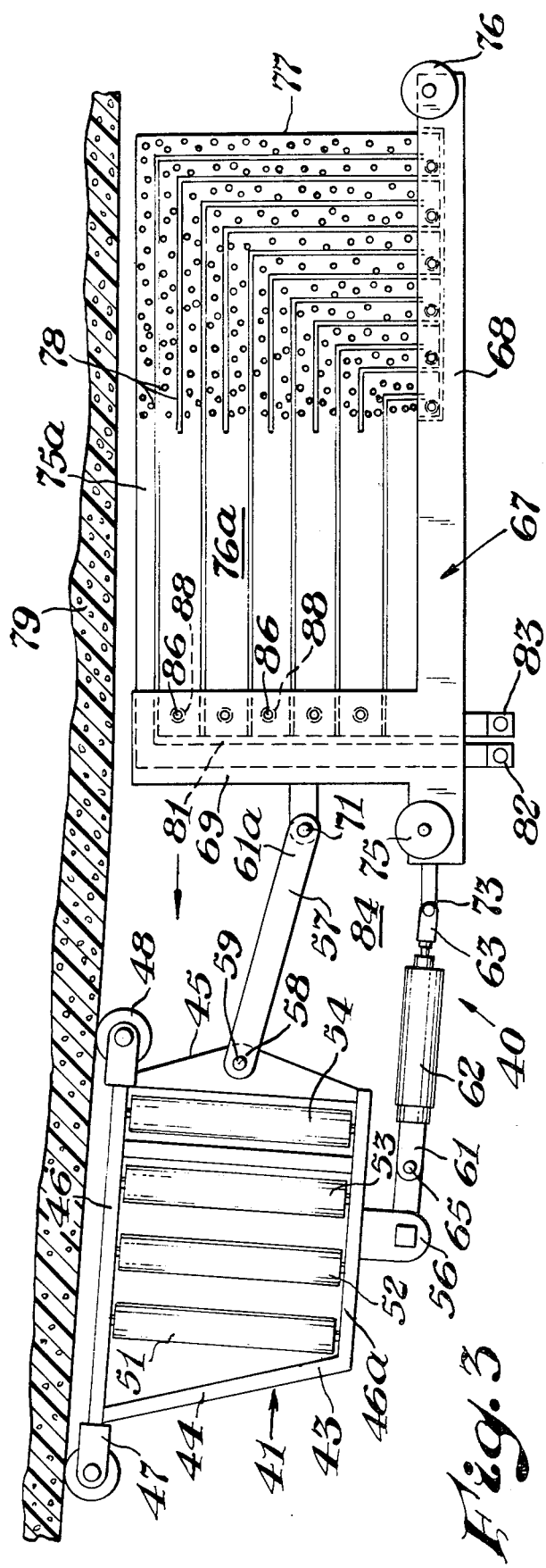
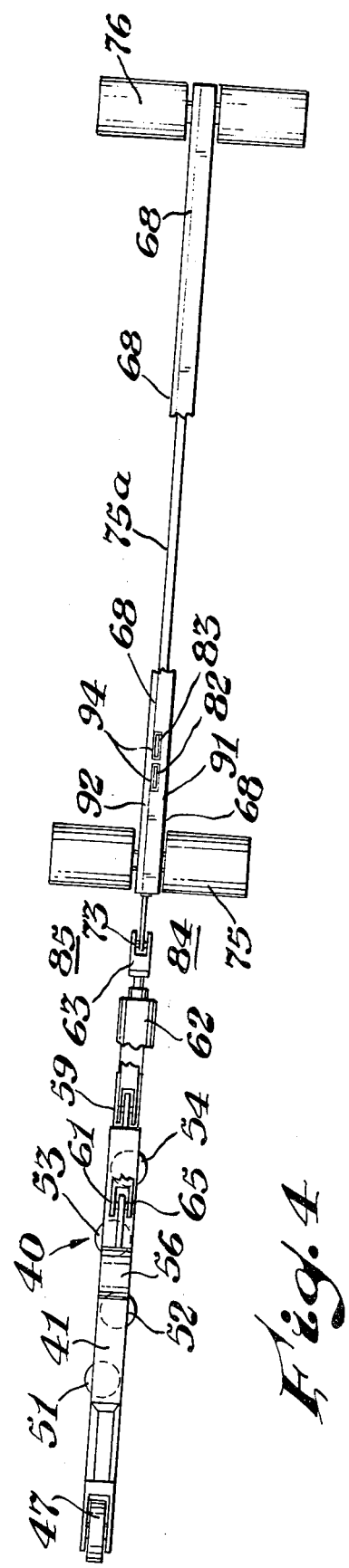

FOAM WELDING APPARATUS

Vessels oftentimes are beneficially thermally insulated by means of the spiral deposition of a preformed foamed thermoplastic strip about their periphery to provide a layer of foamed insulation of desired thickness. Frequently, the deposited foam strip includes glass fiber reinforcing therein and a vapor barrier such as aluminum strip on the outer surface thereof. Insulation of the vessels employing the spiral generation technique is disclosed in U.S. Pat. Nos. 4,017,346 and U.S. Pat. No. 4,050,607, the teachings of which are herewith incorporated by reference thereto. In the insulation of vessels or other structures using the spiral generation technique, a foam strip is positioned by means of a foam-depositing head. The foam-depositing head is supported external to the structure and adjacent the tank. The foam-depositing head is moved in a generally helical spiral path as a foam strip is fed to the head, the head heating the foam strip to cause softening thereof and each loop of the strip about the tank is welded to its adjacent neighbor. In cases where such spirally generated insulation is employed on vessels used for cryogenic applications, for example, on a vessel for the containment of liquefied natural gas, the insulation is subjected to substantial thermal stresses. The thermoplastic foam used for such insulation will be subjected to ambient temperatures on the outside of the insulation while on the inside temperatures can be about $-260°$ F. Such a thermal gradient can result in fracture or at least partial fracture of a weld between adjacent turns of thermoplastic foam. In the past, such welds have not always shown the desired degree of uniformity, such uniformity being evaluated by sampling a portion of the insulation in which at least one weld exists, breaking the foam adjacent the weld and examining the weld for uniformity of nonfoamed polymer generated during the welding process. In the spiral generation of an insulating layer about a cylindrical tank, less difficulty is encountered because of a tendency of the heat-welding blade to move from between adjacent strip portions; however, on the insulation of spherical tanks where the radius of curvature changes and one encounters variations from the design geometry of the structure, the heating element or blade may move from its desirable position between adjacent foam strips and weld less than the desired area.

It would be desirable if there were available an improved heat-welding assembly for the joining of adjacent thermoplastic foam bodies in the spiral generation of insulation about a vessel.

It would also be desirable if there were available an improved apparatus for the spiral generation of thermoplastic insulation about a body which would provide welds of increased uniformity.

It would also be desirable if there were available an improved apparatus for the preparation of spirally-generated insulation about a vessel which would reasonably assure uniformity of the welds when the vessel geometry deviates from ideal.

These benefits and other advantages in accordance with the present invention are achieved in an insulation applying apparatus comprising in cooperative combination a first support means, a means to propel the first support means about the periphery of an object to be insulated, an insulation depositing means supported by the first support means and selectively moveable relative to the first support means, the depositing means adapted to trace a generally spiral path over at least a portion of an object to be insulated, means to heat surfaces of adjacent foam strips to a temperature sufficient to fuse the thermoplastic foam strips together, the improvement which comprises the means to heat surfaces is a generally planar heating element of sufficient size to engage surfaces of adjacent thermoplastic foam strips, the heating element having a first generally unheated leading end, a second or heatable trailing end, the heating element having a first or tank side and a second or exterior side, the heating element defining a plurality of generally L-shaped interdigitated slots, the slots being generally parallel to the ends and sides of the heating element, the heating element defining an electrical serpentine path, the heating element being of electrically conductive material and defining a region of greater electrical resistance adjacent the trailing end and means to maintain the heating element in generally fixed lateral relationship relative to the foam strips being welded.

Further features and advantages of the present invention will become more apparent from the following specification taken in cnnection with the drawing wherein:

FIG. 3 is a plan view of heat-sealing apparatus in accordance with the present invention;

FIG. 4 is a side view of the apparatus of FIG. 3; and

Figure 1:
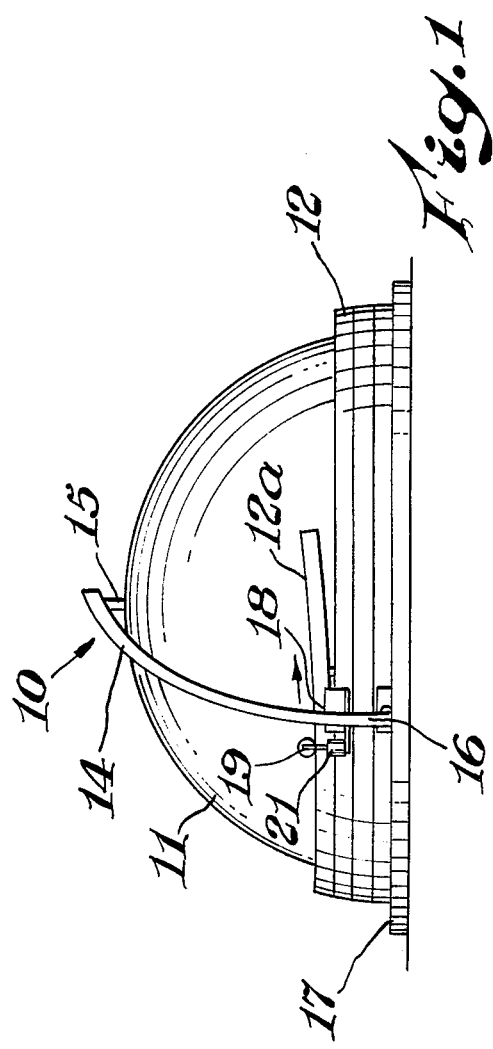
FIG. 1 is a simplified schematic representation of apparatus for the spiral generation of an insulating layer of thermoplastic foam about a vessel.

In FIG. 1 there is shown a simplified schematic representation of an apparatus in accordance with the invention designated by the reference numeral 10. The apparatus 10 is operating on a structure 11 depositing insulation 12 in form of a plurality of loops. The apparatus 10 comprises a first support means 14 such as a curved track. The first support means 14 is pivotally affixed to the spherical container 11 by means of a pivot 15. The first support means 14 has a second or lower end 16 which is supported by a track or rail 17 permitting the support means 14 to move around the insulation 12 and container 11. An insulation-depositing means or foam-depositing head 18 is supported on the first support means 14. The foam-depositing head 18 has rolls 19 and 21 in engagement with foam insulation 12 and a foam billet 12a being deposited by the foam depositing head 18. Rolls 19 and 21 move the head 18 and the first support means 14 in a generally spiral-helical path about the container 11 until a substantial portion of the surface is covered with insulating material 12. The head 11 has a heating platen or element (not shown) which, by melting adjacent surfaces of thermoplastic foam 12a and 12, the molten surfaces are forced together and, on cooling, a monolithic insulation is obtained.

Figure 2:
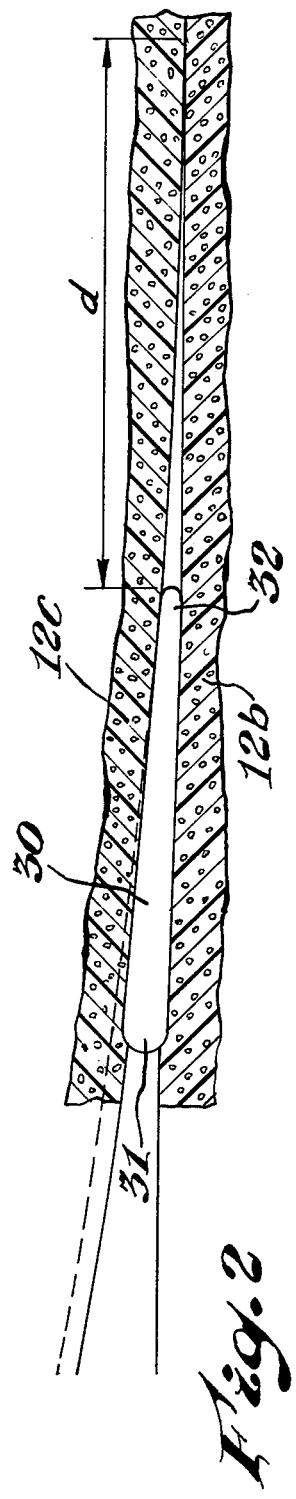
FIG. 2 is a schematic representation of a heating platen or welding blade in accordance with the prior art.

In FIG. 2 there is depicted a cross-sectional configuration 30 of a heating platen in accordance with the prior art. The heating platen 30 is in engagement with a thermoplastic foam body 12b upon which is being deposited a strip of foam 12c. The foam 12c is bent upwardly at an angle of about 7.65°. The blade or platen 30 has a leading edge 31 and a trailing edge 32. A distance "d" is required for the foam member 12c to attain its final configuration. The distance "d", for convenience, is termed "the closing distance" and for a heating platen having the cross-sectional configuration of the platen 30, nine inches in length, that is from trailing edge to leading edge and with the thickness of the leading edge being ⅛ of an inch and the thickness of the trailing edge being ⅜ of an inch, the closing distance "d" is about ten and one-half inches.

In FIG. 3 there is depicted a plan view of heating platen assembly in accordance with the present invention generally designated by the reference numeral 40. The heating platen assembly 40 comprises a platen support and positioning member 41. The support member 41 has a generally hollow rectangular frame 43 having a leading end 44, a trailing end 45, a structure side 46 and an external side 46a. FIG. 4 depicts a side view of the assembly of FIG. 3 in engagement with foam. The support 41 has a first structure engaging roll 47 affixed external to the frame at the juncture of the leading edge 44 and the structure side 46. A similar structure engaging roll 48 is disposed generally at the juncture of the structure side 46 and the trailing edge 45. The axes of the rolls 47 and 48 lie in a plane generally perpendicular to a plane containing the frame 41. Within the frame 41 are disposed rolls 51, 52, 53 and 54. The rolls 51, 52, 53 and 54 are each rotatably affixed to the side members 46 and 46a of the frame and extend generally normal to a plane containing the axes of rolls 47 and 48. Rolls 51 and 53 extend slightly beyond the frame 41 on the upper side thereof while rolls 52 and 54 project beneath the frame 41. The frame 41 has disposed thereon an outwardly projecting connector 56. The connector 56 pivotally connects to a foam-depositing head such as the head 18 of FIG. 1. A fixed length link 57 is pivotally affixed by a first end 58 to a pivot 59 affixed to the trailing end 45 of the frame 41. The line 57 has a second end 61a remotely disposed from the pivot 59. A variable length link 62 having a first end 61 and a second end 63 is pivotally affixed to the first end 61 to the connector 56 by the pivot 65. Beneficially, variable length link 62 is a pneumatic cylinder, hydraulic cylinder or turnbuckle. A heating platen frame 67 is disposed adjacent to the trailing end 45 of the frame 41. The heating platen frame has a first or elongate arm 68 and a second or shorter arm 69. The arm 68 extends generally parallel to the external side member 46a of the frame 41 and the arm 69 extends generally parallel to the rolls 51, 52, 53 and 54. The first link 57 is pivotally affixed to arm 69 at pivot point 71 at the second end 61a of the arm 57. The second end 63 of link 62 is pivotally affixed to arm 68 of frame 67 at a pivot point 73. A first or leading split roller 75 is rotatably affixed to arm 68 adjacent pivot point 73. A second split roller 76 is rotatably affixed to arm 68 remote from pivot point 73. The axes of the rollers 75 and 76 are generally parallel to the axes of rollers 47 and 48. A heating platen 75a is clamped within frame 67 and is insulated electrically from the frame 67. Beneficially, such insulating material may be silicone resin-impregnated glass cloth or the like. The heating platen 75a has a first or leading end 76a and a second or trailing end 77. The trailing portion of the platen is a portion that is heated to melt and bond the foam. The trailing portion in FIG. 3 has a plurality of perforations 78 whereas the platen in the leading region 76a is unperforated. The platen 75a is provided with a plurality of interdigitated L-shaped slots. Alternate slots opening external to the platen 75a in a region adjacent portion 77 of the platen and remote from a structure wall 79 upon which synthetic resinous thermoplastic foam is being deposited as insulation. A second set of L-shaped slots terminate in region 76a generally adjacent the trailing edge 45 of the frame 41 wherein a transverse slot 81 is formed. The interdigitated L-shaped slots together with the slot 81 form a serpentine electrical path between electrical connectors 82 and 83 of platen 75a. The connectors 82 and 83 extend through the frame 67 and are located remotely from region 77 of the platen 75a and wall 79. A foam body 84 is disposed beneath the platen assembly 40 and is engaged by the lowermost halves of the split rolls 75 and 76.

In operation of the assembly 40, connector 56 is affixed to a head such as the head 18 of the apparatus 10, appropriate current applied to connectors 82 and 83, and the heating assembly 40 moved in the direction indicated by the arrow. Foam passing over portion 77 of the platen 75a is heated to a temperature sufficient to heat-plastify the foam. As the platen is moved from between adjacent bodies of foam such as bodies 84 and 85. In FIG. 4, the quantity of heat-plastified foam is sufficient that only a very small, if any, gas containing gap exists between the adjacent foam bodies at the terminal portion 77 of the heating platen 75a. Beneficially, a platen such as the platen 75a is fabricated from stainless steel sheet by sawing the appropriate slots or grooves and increasing the electrical resistance of the heating portion of the platen by drilling or punching a plurality of holes to reduce the effective electrically-conducting cross-section thereof. Platens such as the platen 75a beneficially may be positioned within the frame 67 by means of a plurality of rivets such as the rivets 86 which are insulated from the platen 75a by means of insulating collars 88. Alternatively, the rivets may be replaced with flat-headed machine screws or other equivalent fasteners. Advantageously, the frame 68 can be made two portions: a first or lower portion 91 and a second or upper portion 92. As shown in FIG. 4, the lower portion 91 is recessed to receive the platen 75a and an appropriate layer of insulation thereabout as indicated in FIG. 4 by the reference numeral 94. Such electrical insulation beneficially may be silicone-impregnated glass cloth and the like. In effect, the platen 75a is affixed to the frame 41 by a four-bar linkage whose points are 59, 71, 65 and 73. When the rolls 47 and 48 of the support member 41 are pressed against wall 79, the platen 75a is accurately positioned by adjustment of the variable link 62, causing the platen to pivot in its own plane. Beneficially, when link 62 is a pneumatic cylinder, minor irregularities in the wall of the structure or vessel are readily followed.

Figure 5:
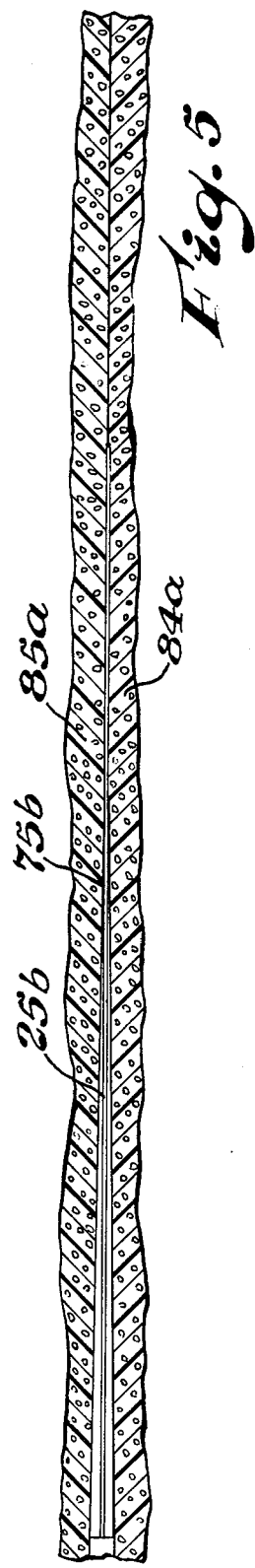
FIG. 5 is a schematic representation of two strips of foam being joined by the heat-welding apparatus of the present invention.

FIG. 5 is a representation of a platen 75b in engagement and joining foam bodies 84a and 85a. Employing a platen having a thickness of about ⅛ of an inch, substantially less bending of the foam is required, the angle being about 1.1° and the closing distance being 0 to 6 and ½ inches which desirably is full of melted foam.

Beneficially, heating platens such as the platen of 75b are prepared from any electrically conducting sheet of material such as brass, stainless steel and the like. It is preferred in most instances to employ stainless steel, particularly if the apparatus is to operate in a seacoast environment. The thickness of the platen can be from about ¼ of an inch to about ¼ of an inch and beneficially for most applications are about ⅛ of an inch in thickness. For ease of operation, thinner platens are preferred; however, a thicker platen is frequently employed in order to provide adequate mechanical strength to resist handling when the apparatus is being assembled or in operation. Generally, when the apparatus stops and power is removed from the heating platen, a portion of the foam is melted which lies adjacent to the heating platen. The thinner the platen, the less the heating capacity and therefore, the smaller the quantity of the foam that is melted. Such phenomena is oftentimes referred to as "meltout" and must be repaired when the apparatus has moved away from the location suffering from the "meltout".

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. In an insulation applying apparatus comprising in cooperative combination a first support means, a means to propel the first support means about the periphery of an object to be insulated, an insulation depositing means supported by the first support means and selectively moveable relative to the first support means, the depositing means adapted to trace a generally spiral path over at least a portion of an object to be insulated, means to heat surfaces of adjacent thermoplastic foam strips to a temperature sufficient to fuse the thermoplastic foam strips together, the improvement which comprises the means to heat surfaces is a generally planar heating element of sufficient size to engage surfaces of adjacent thermoplastic foam strips, the heating element having a first generally unheated leading end, a second or heatable trailing end, the heat element having a first or tank side and a second or exterior side, the heating element defining a plurality of generally L-shaped interdigitated slots, the slots being generally parallel to the ends and sides of the heating element, the heating element defining an electrical serpentine path, the heating element being of electrically conductive material and defining a region of greater electrical resistance adjacent the trailing end and means to maintain the heating element in generally fixed lateral relationship relative to the foam strips being welded.

2. The apparatus of claim 1 wherein the second or heatable trailing edge is of perforated sheet construction.

3. The apparatus of claim 1 wherein the heating element has a thickness of from about 1/16 of an inch to about ¼ of an inch.

4. The apparatus of claim 1 including a heating element support means pivotally affixed to the heating element by a four-bar linkage whereby the heating element pivots in the plane of the heating element.

5. The apparatus of claim 4 wherein the four-bar linkage has a variable length link to thereby force the heating element toward the object to be insulated.

6. The apparatus of claim 5 wherein the variable length link is a pneumatic cylinder.

* * * * *